United States Patent [19]

Opower

[11] Patent Number: 4,551,608
[45] Date of Patent: Nov. 5, 1985

[54] MATERIAL WORKING APPARATUS

[75] Inventor: Hans Opower, Krailling, Fed. Rep. of Germany

[73] Assignee: W.C. Heraeus GmbH, Hanau, Fed. Rep. of Germany

[21] Appl. No.: 608,992

[22] Filed: May 10, 1984

[30] Foreign Application Priority Data

May 10, 1983 [DE] Fed. Rep. of Germany ....... 3317022

[51] Int. Cl.$^4$ ............................................. B23K 26/00
[52] U.S. Cl. ........................... 219/121 L; 219/121 LQ
[58] Field of Search ..... 219/121 L, 121 LM, 121 LP, 219/121 LQ, 121 LV; 372/95, 92; 350/486

[56] References Cited

U.S. PATENT DOCUMENTS

| 3,681,709 | 8/1974 | Brown ................................ 372/92 X |
| 3,824,487 | 7/1974 | Buczek et al. ......................... 372/95 |
| 3,969,685 | 7/1976 | Chenausky et al. ................... 372/95 |
| 4,367,017 | 1/1983 | Jimbou et al. ............ 219/121 LV X |

FOREIGN PATENT DOCUMENTS

WO80/01419  7/1980  PCT Int'l Appl. .

*Primary Examiner*—C. L. Albritton
*Attorney, Agent, or Firm*—Felfe & Lynch

[57] ABSTRACT

High-power laser metalworking apparatus, especially one having a carbon dioxide laser. After the laser beam emerges from an optical resonator it is deflected by a mirror against a workpiece and focused on the surface thereon. An image-rotating means is disposed in the beam path after the deflection mirror, and has an odd number of fully reflective mirrors, but at least 3 such mirrors. The angle of rotation of the image-rotating means is electronically controllable in accordance with the direction of the path of the working movement. The image-rotating means and focusing system advantageously form a single component in which at least one of the mirrors of the image-rotating means focuses the laser beam onto the surface of the workpiece. Preferred is a laser having an unstable optical resonator with at least three fully reflective mirrors of cylindrical curvature, the mirrors whose planes of curvature are parallel to one another defining the optical resonator, and the third mirror, or every additional mirror, being concavely curved in a plane perpendicular with respect to the mirrors defining the resonator.

3 Claims, 4 Drawing Figures

MATERIAL WORKING APPARATUS

BACKGROUND OF THE INVENTION

Laser-equipped material working apparatus, for example, machining and welding apparatus, which can be used for precision cutting or welding operations, must apply a high beam intensity to the surface of the workpiece within a very small and very precisely and repeatably defined cross section. In many cases, as in the cutting of metals, it is also desirable to maintain one particular direction of polarization.

Usually the effort is made to satisfy these requirements by striving to construct the laser so as to produce a beam of rotation-symmetrical cross section, if possible even with a Gaussian distribution. In this manner it is possible to assure equal conditions regardless of the path to be traced on the workpiece. The requirements concerning direction of polarization are fulfilled in like manner by the introduction of a rigid mirror system which converts the linearly polarized beam emerging from the laser to a circularly polarized beam.

The need for rotational symmetry, however, in the case of high-power lasers, such as carbon dioxide lasers with a power of more than 1000 watts, can be satisfied repeatably only with great difficulty, so that the known high-power lasers are but insufficiently suitable, particularly for precise cutting operations.

It is an object of the invention, in apparatus using high-power lasers in the multi-kilowatt range, to assure an always optimum and repeatable intensity distribution and polarization adapted to the path of relative movement of the beam.

BRIEF DESCRIPTION OF THE INVENTION

In accordance with the invention, material working apparatus comprises a high-power laser having an optical resonator for providing an optical beam. The apparatus includes means for directing the optical beam toward a work piece that is to be worked including image-rotating means which has an odd number of, but at least three, fully reflective mirrors rotatable about the optical beam axis. The apparatus also includes means for electronically controlling the angle of rotation of the image-rotating means about the optical beam axis according to the direction of the working path.

The above-mentioned object is achieved in material working apparatus, for example, machining and welding apparatus having a high-power laser, especially a carbon dioxide laser, whose beam, after emerging from an optical resonator, is deflected by a mirror onto a workpiece and is focused on the surface of the workpiece, by the fact that, in accordance with the invention, there is disposed in the optical beam path following the deflecting mirror, an image-rotating means having an odd number of, but at least three, fully reflective mirrors, and its angle of rotation about the optical beam axis can be controlled electronically according to the direction of the path of relative movement of the beam.

With such an image-rotating means it is possible to align even an originally asymmetrical laser beam always in the same manner with the direction of relative movement of the beam and workpiece, so that the same, optimum results are achieved in all directions. Such an image-rotating means also produces a corresponding rotation of the plane of polarization of the laser beam, so that the requirement with regard to optimum direction of polarization is thus also satisfied.

The image-rotating means of the invention has proven especially useful in combination with a high-power laser having an unstable optical resonator with at least three fully reflective mirrors of cylindrical curvature, while the mirrors, whose planes of curvature are parallel to one another, define, or represent the end mirrors of, the optical resonator, and while the third mirror, or each additional mirror, is concavely curved in a plane perpendicular with respect to the mirrors defining the resonator. A high-power laser of this kind is described in the prior German Patent Application No. P 33 15 620.4 and in applicant's copending U.S. application corresponding thereto and entitled "High Power Laser Having An Unstable Optical Resonator", Ser. No. 602,233, filed Apr. 19, 1984.

In the high-power laser, the mirrors advantageously have a rectangular cross section, and the mirrors defining the optical resonator form a confocal resonator. The fully reflective mirrors are advantageously metal mirrors.

In the simplest embodiment, the image-rotating means consists of three planar mirrors, two of them disposed at an obtuse angle to one another and the third mirror situated opposite the apex of the obtuse angle.

An important simplification, combined with a reduction of the number of optical elements, is achieved in a material working apparatus such as a machining and welding apparatus by having the image-rotating means also take over the task of focusing. In this case the image-rotating means consists advantageously of three mirrors, of which at least one of the mirrors focuses the laser beam onto the workpiece surface. In a preferred embodiment of the image-rotating means, two mirrors are planar and disposed at an obtuse angle to one another, and the third mirror, which is situated opposite the apex of the obtuse angle, has a concave curvature. This curvature will best be aspherical in order to prevent image errors.

Freedom from image error can also be achieved if the mirror that focuses the laser beam is spherical and at least one of the other two mirrors of the image-rotating means is given a slight cylindrical curvature.

For a better understanding of the present invention, together with other and further objects thereof, reference is made to the following description, taken in connection with the accompanying drawings, and its scope will be pointed out in the appended claims.

BRIEF DESCRIPTION OF THE DRAWINGS

Material-working apparatus in accordance with the invention is represented diagrammatically in the drawings, wherein.

DESCRIPTION OF THE EMBODIMENTS

Figure 1:
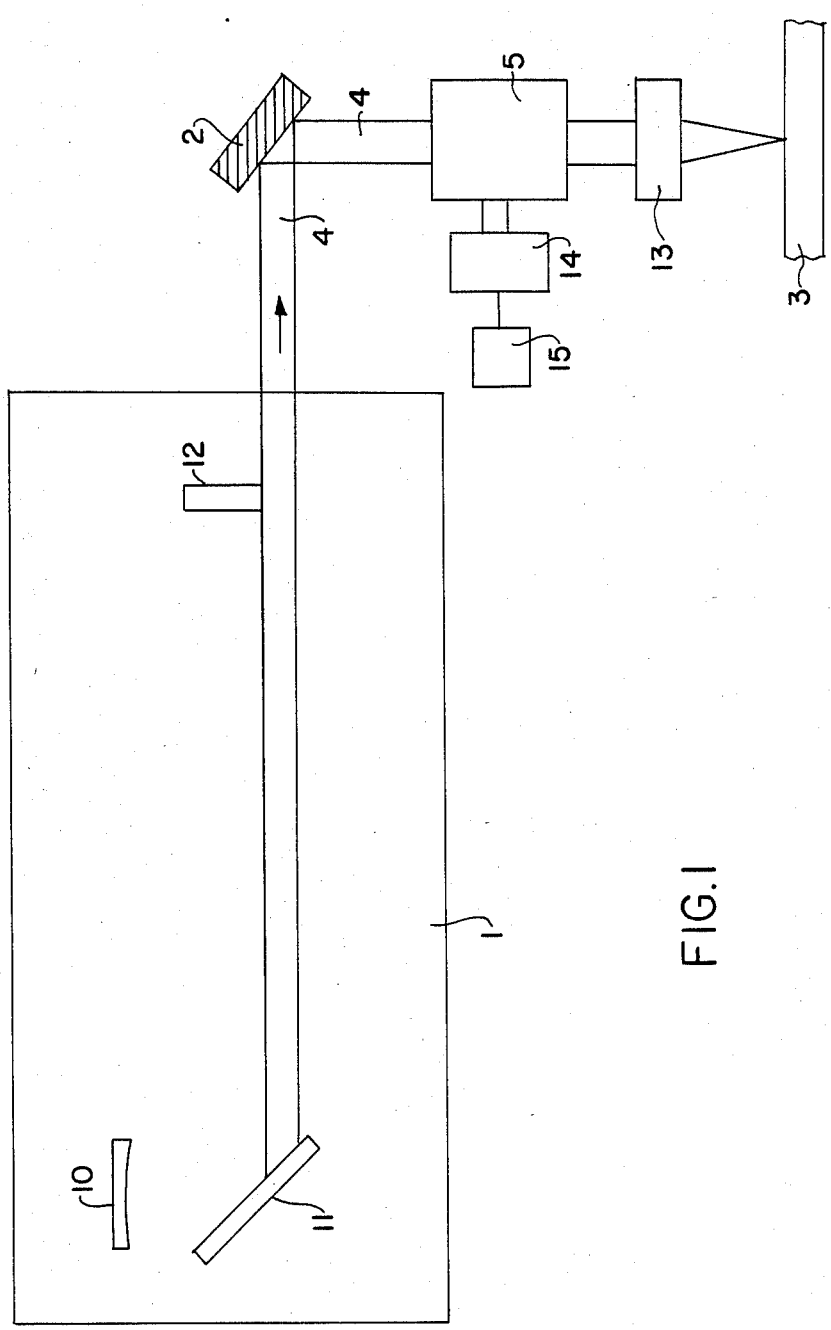
FIG. 1 is a diagrammatic representation of a plan view of the beam path of the machining and welding appartus with image-rotating means followed by a focusing system

In FIG. 1, the reference number 1 is associated with the laser resonator with the three mirrors, 10, 11 and 12, which are cylindrically curved. The mirrors 10 and 12, whose planes of curvature are parallel, (for example, parallel to the plane of the drawings), define the optical resonator, and the mirror 11 is concavely curved in a plane perpendicular with respect to the mirrors 10 and 12 defining the resonator, (for example, in a plane perpendicular to the plane of the drawing). The azimuth angle at which the plane of curvature of the mirror 11 intersects the drawing plane need not be specified exactly, but preferably is less than 45° to the longitudinal axis. The beam 4 leaving the resonator is deflected by means of the mirror 2 and passes through the image-rotating means 5 and the focusing system 13 to form a focused beam impinging upon the surface of the workpiece 3. The image-rotating means 5 is rotated by the drive 14. The drive 14 is electronically controlled by means of the control unit 15 according to the direction of the working path.

Figure 2:
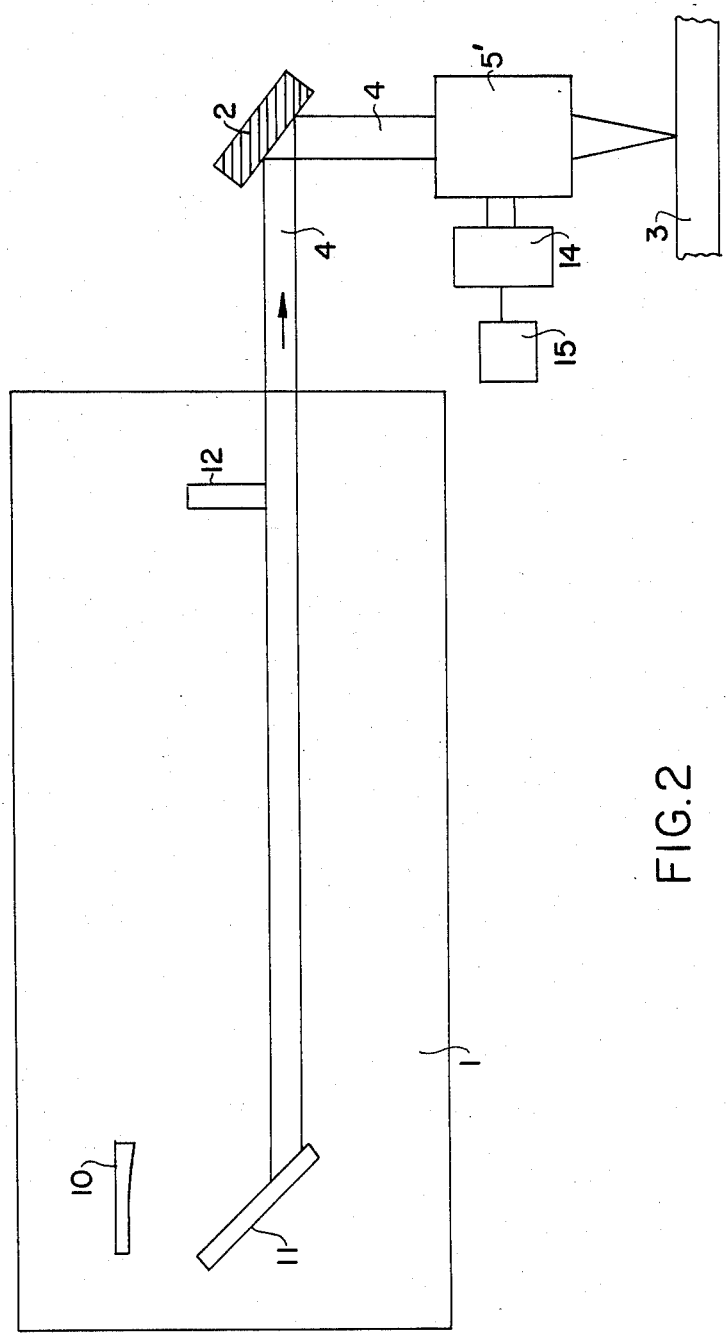
FIG. 2 is a diagrammatic representation of a plan view of the beam path of a machining and welding apparatus in which the image-rotating means and focusing system are combined in one unit.

The system represented in FIG. 2 differs from the one represented in FIG. 1 in that the image-rotating means and the focusing system are combined in one unit 5' and the beam emerging from the image-rotating means impinges convergently, and without the interposition of any other optical elements, onto the workpiece 3.

Figure 3:
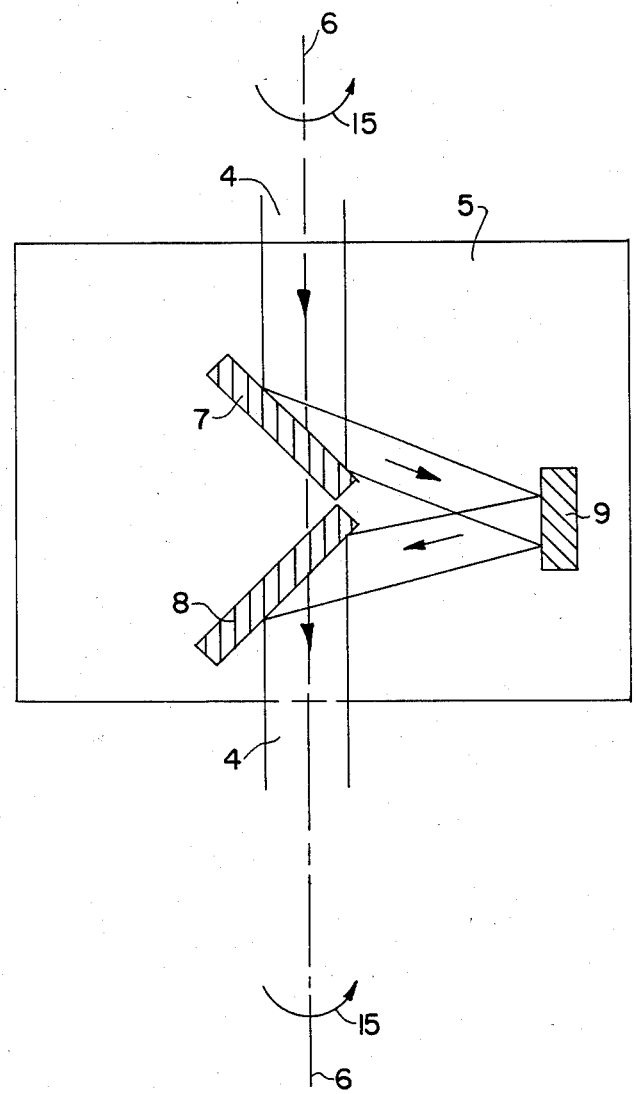
FIG. 3 is a diagrammatic representation of a plan view of an image-rotating means for a machining and welding apparatus of FIG. 1.

The image-rotating system 5 represented in FIG. 3 is rotatable about the optical axis 6 of the beam 4, as represented by arrow 15. The image-rotating means has the three planar mirrors 7, 8 and 9, mirrors 7 and 8 being disposed at obtuse angles to one another and mirror 9 being opposite the apex of the obtuse angle.

Figure 4:
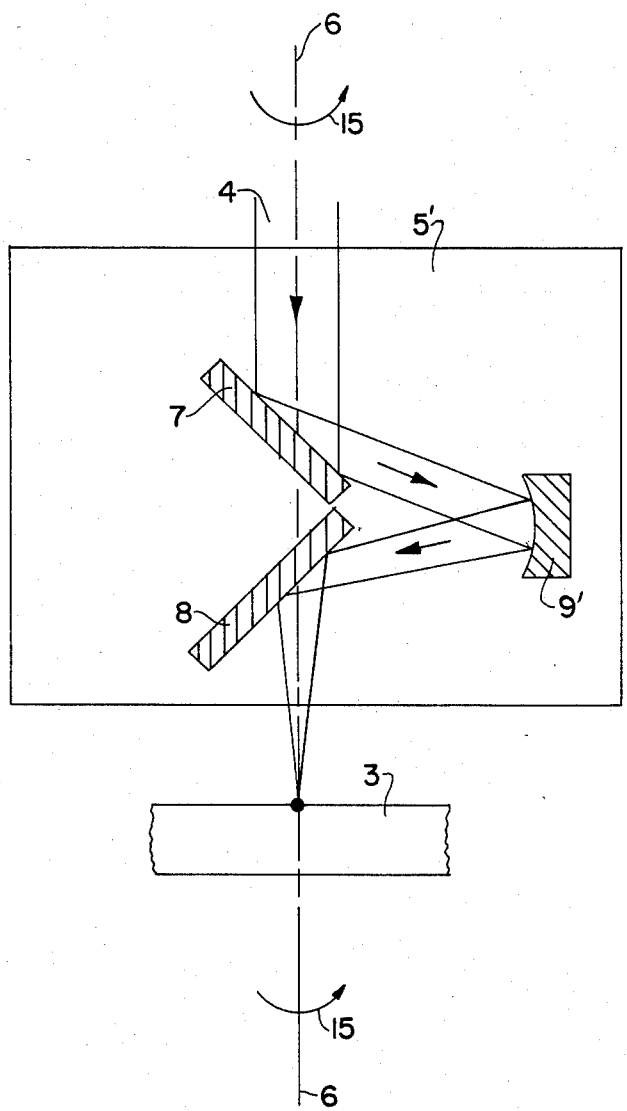
FIG. 4 is a diagrammatic representation of a plan view of an image-rotating means and focusing system for a machining and welding apparatus of FIG. 2.

As the system represented in FIG. 4 shows, the image rotating means and the focusing means form a single component 5'. This component is also, as indicated by arrow 15, rotatable about the optical axis 6 of the optical beam path 4. In this embodiment, the component 5' has two planar mirrors 7 and 8 which are disposed at an obtuse angle to one another, and the mirror 9' opposite the apex of the obtuse angle has a concave curvature, so that, after leaving the component 5', the beam is focused on the surface of the material 3. Thus, at least one of the mirrors focuses the laser beam onto the workpiece surface 3 that is to be worked.

In another preferred embodiment, which may also be considered as represented diagrammatically by FIG. 4, the mirror 9' is spherically curved and at least one of the mirrors 7 and 8, for example, the mirror 7, has a slightly cylindrical curve.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A combination for working materials, comprising:
   a laser having an unstable optical resonator, including cylindrical mirrors, for emitting an optical laser beam;
   at least one additional mirror for deflecting said optical beam onto a workpiece; and
   image-rotating means disposed in said optical beam and including an uneven number, but at least three, fully reflective mirrors, the angle of rotation of said image-rotating means about the optical beam axis being electronically controllable according to the direction of the working path.

2. A combination in accordance with claim 1, in which said resonator includes at least three fully reflective cylindrical mirrors of which two have planes of curvature parallel to one another and define the resonator, and in which at least the third mirror for the reflection of said beam is disposed in the beam path between said two mirrors defining said resonator and is concavely curved in a plane perpendicular with respect to said two mirrors defining said resonator, whereby the emitted laser beam is linearly polarized.

3. A combination in accordance with claim 2, in which said at least three cylindrical mirrors have rectangular cross sections.

* * * * *